(12) United States Patent
Whitell

(10) Patent No.: US 6,173,917 B1
(45) Date of Patent: Jan. 16, 2001

(54) GRANULAR MATERIAL SPREADER

(76) Inventor: David Whitell, Box 98, Delacour (CA), T0M 0T0

(*) Notice: Under 35 U.S.C. 154(b), the term of this patent shall be extended for 0 days.

(21) Appl. No.: 09/494,442

(22) Filed: Jan. 31, 2000

(51) Int. Cl.$^7$ .............................. A01C 15/00; A01C 19/00
(52) U.S. Cl. ...................... 239/660; 239/650; 239/667; 239/668; 239/671; 239/675; 239/681; 239/684; 239/687; 222/228; 222/231; 222/236; 414/526
(58) Field of Search .................................... 239/650, 660, 239/661, 667, 668, 670, 671, 672, 675, 676, 680, 681, 684, 687; 198/670, 671; 414/526, 503; 222/228, 231, 236, 240

(56) References Cited

U.S. PATENT DOCUMENTS

| | | | | |
|---|---|---|---|---|
| 3,339,759 | * | 9/1967 | Wellons | 222/236 X |
| 4,363,428 | * | 12/1982 | Kruger | 222/236 X |
| 4,991,781 | * | 2/1991 | Barbieri | 239/661 |
| 5,340,033 | | 8/1994 | Whitell | 239/676 |

* cited by examiner

*Primary Examiner*—Andres Kashnikow
*Assistant Examiner*—Robin O. Evans

(74) *Attorney, Agent, or Firm*—David S. Thompson

(57) ABSTRACT

A granular material spreader is adapted for towing behind a yard tractor. A frame upports an inverted cone which is sized to contain a supply of granular material for distribution. The bin sweep rod is carried adjacent to the inside surface of the cone, and turns a drive spring. The drive spring drives a helix, which rotates about the bin sweep rod, driving the granular material toward the narrow base of the cone. Should the helix become jammed, the drive spring snaps past the helix, rather than risk damage by forcing its movement. A bin sweep drive wheel is also driven by the revolution of the bin sweep. Movement of the wheel against the an upper portion of the outside surface of the cone moves the bin sweep rod and helix in a circular path about the inside surface of the cone. A valve at the base of the cone allows granular material to drop into a housing which defines slots about portions of its perimeter. The blade support plate, rotating at the base of the housing, carries a plurality of blades, which drive the granular material through the slots and from the housing. The vane support plate, rotates just below the blade support plate carrying a plurality of vanes. Movement of the vanes throws the granular material ejected from the housing by the blades in a wide-spread and evenly distributed manner.

5 Claims, 5 Drawing Sheets

GRANULAR MATERIAL SPREADER

BACKGROUND

It is well-known that a granular material spreader may be used to distribute fertilizer and other granular materials over grass-covered areas, such as golf courses, sporting fields and public parks. In spite of several advancements in this field, several mechanical problems remain.

A bin sweep, which moves the material in the upper portion of a storage cone downwardly, is a well-known improvement. Unfortunately, such bin sweeps are prone to failure, which can result in down time and repair expense. One of the most serious problems results when a rock, an over-sized granule or a fused mass of particles becomes lodged between the bin sweep and the inside surface of the cone. When the bin sweep is unable to advance, it may break.

Many of the materials distributed in this manner, such as fertilizer, seed, gravel, salt and lime also tend to be difficult to spread in an even and uniform manner. Areas of greater or lesser coverage tend to result, which can result in less than optimum growth performance by the grass.

The size of the golf courses and sporting fields which are tended encourages the development of granular spreaders which are able to distribute material over a wider range. Unfortunately, known spreaders tend to perform less uniformly the greater the range of the spreader. Therefore, where the granular material is widely thrown, it is also unevenly thrown.

For the foregoing reasons, there is a need for granular spreader that is adapted with a protective mechanism which prevents damage when the bin sweep becomes jammed. The granular spreader must distribute material in a very even and homogeneous manner, and must provide structures which result in the ability to distribute material over a wider range than is possible with existing granular material spreaders.

SUMMARY

The present invention is directed to an apparatus that satisfies the above needs. A novel granular material spreader is disclosed that prevents damage when the bin sweep is jammed, which is adapted to very even and homogeneous material distribution over a very wide area.

The granular material spreader is adapted for towing behind a yard tractor having a power take off unit, and provides some or all of the following structures.

(A) A frame supports the elements of the granular spreader. Wheels supported by the frame are preferably set behind the center of gravity, thereby increasing the trailer hitch weight.

(B) A cone, having the narrow end directed downwardly, is supported by the frame and is sized to contain a supply of granular material to be distributed. The upper end of the drive shaft is located at the narrow end of the cone.

(C) A bin sweep assembly is carried by the cone, and breaks up the granular material, sending it to the base of the cone. A bin sweep drive shaft is carried a short distance from the inside surface of the cone. A lower end of the bin sweep drive shaft is attached by a U-joint to a drive shaft at the base of the cone and the upper end is attached to a bin sweep drive wheel assembly.

(D) The bin sweep drive wheel is driven by a belt which is powered by rotation of the bin sweep drive shaft. The bin sweep drive wheel causes the bin sweep drive shaft to move around the interior surface of the cone.

(E) The coil of the drive spring is carried by a fixed pin attached to the helix or outer sleeve. The outer sleeve and helix rotate about the bin sweep drive shaft at the same rate of speed at which the bin sweep drive shaft rotates. Movement of the helix forces granular material toward the base of the cone.

(F) A drive spring is carried by a spindle supported by the helix or outer sleeve. A first end of the drive spring is attached to the outer sleeve or to the helix. A second end of the drive spring is pushed in a circular orbit about the bin sweep drive shaft by an arm extending from the U-joint, or alternatively, from the bin sweep drive shaft. This gives the drive shaft a soft start when the machine is turned on. The second end of the drive spring drives the helix in a circular orbit about the bin sweep drive shaft. Should the helix become stuck for any reason, the drive spring would flex sufficiently to allow the arm pushing the second end of the drive spring to pass, thereby preventing damage and resulting in a sound that would alert the operator.

(G) A valve or gate at the base of the cone may be regulated pneumatically, and delivers granular material into a housing which is carried beneath the cone and above a blade support plate.

(H) A housing, carried below the base of the cone, receives granular material which passes through the valve at the base of the cone. The housing is slotted to allow granular material to be ejected radially. The housing is carried by the frame in a fixed orientation. As a result, strategic location of the slots in the housing prevents granular material exhausted from the housing from hitting elements of the frame or tractor, and gives the spread of granular material its shape or form.

(I) Blades carried by the blade support plate, at the base of the housing, direct the downwardly-moving granular material in the radial direction toward the slots defined in the housing.

(J) Vanes on the outer portion of the vane support plate revolve in a circular pathway, throwing the granular material pushed from the housing by the blades.

It is therefore a primary advantage of the present invention to provide a novel granular material spreader having a two-stage material throwing structure, wherein blades mounted on a blade support plate push granular material from the housing, and vanes carried on an outer portion of a vane support plate throw granular material radially outward.

Another advantage of the present invention is to provide a novel granular material spreader which provides a housing which is slotted in a manner which prevents granular material being directed into the spreader frame or toward the tractor towing the spreader, and results in the shape of the spread of the granular material forming in an evenly distributed pattern substantially behind the granular material spreader.

Another advantage of the present invention is to provide a novel granular material spreader which provides a drive spring carried by the bin sweep rod, whereby the drive spring drives a helix which sweeps the sides of the cone. When the helix becomes jammed, the drive spring flexes to allow continued rotation of the bin sweep drive shaft while the helix is stuck, thereby preventing both from damage.

A still further advantage of the present invention is to provide a novel granular material spreader which includes a frame supporting wheels set to the rear of the center of gravity of the spreader, thereby increasing the hitch weight of the spreader.

DRAWINGS

These and other features, aspects, and advantages of the present invention will become better understood with regard to the following description, appended claims, and accompanying drawings where:

DESCRIPTION

Figure 1:
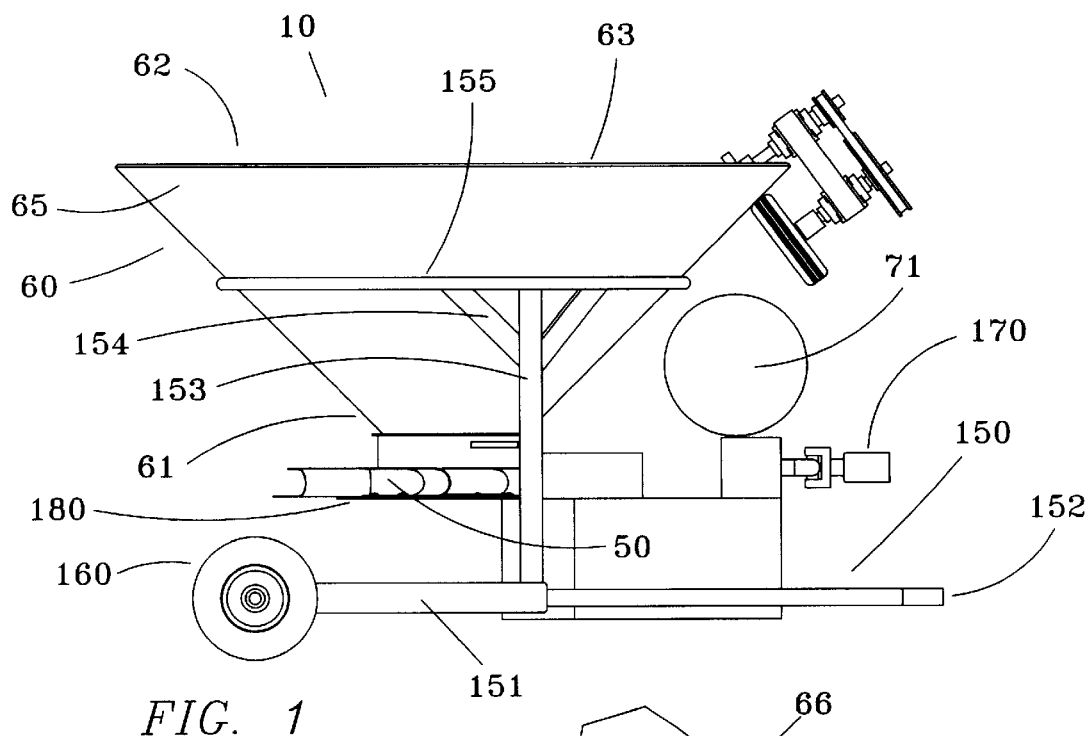
FIG. 1 is an orthographic view of a version of the granular material spreader of the invention.

Referring in general to the figures, a granular material spreader 10 is adapted for towing behind a yard tractor having a power take off unit (PTO). A PTO attachment 170, having appropriate gears and drive chains, turns a bin sweep drive shaft 91, a blade support plate 30 and a vane support plate 180. A frame 150 supports an inverted cone 60 which is sized to contain a supply of granular material for distribution. The bin sweep rod is carried adjacent to the inside surface of the cone, and turns a drive spring 110. The drive spring drives a helix 100, which rotates about the bin sweep rod, driving the granular material toward the narrow base of the cone. Should the helix become jammed, the drive spring snaps past the helix, rather than risk damage by forcing its movement. A bin sweep drive wheel assembly 130 is also driven by the revolution of the bin sweep drive shaft. Movement of the wheel against the an upper portion of the outside surface of the cone moves the bin sweep assembly and helix in a circular path about the inside surface of the cone. A valve 70 at the base of the cone allows granular material to drop into a housing 140 which defines slots about portions of its perimeter. The blade support plate 30, rotating at the base of the housing, carries a plurality of blades 40, which drive the granular material through the slots and from the housing. The vane support plate 180, which rotates just below the blade support plate, carries a plurality of vanes 50. Movement of the vanes throws the granular material ejected from the housing by the blades in a wide-spread and evenly distributed manner.

The reader's attention is directed to U.S. Pat. No. 5,340,033, issued to David Whitell on Aug. 23, 1994, which is hereby incorporated herein by reference.

As is best seen in FIG. 1, the frame 150 supports the elements of the granular spreader. Rearwardly directed extensions 151 support the wheels 160 behind the center of gravity of the spreader 10, thereby increasing the weight supported by the trailer hitch 152. Support columns 153 and braces 154 carry a cone support loop 155 within which the cone 60 is carried.

Figure 8:
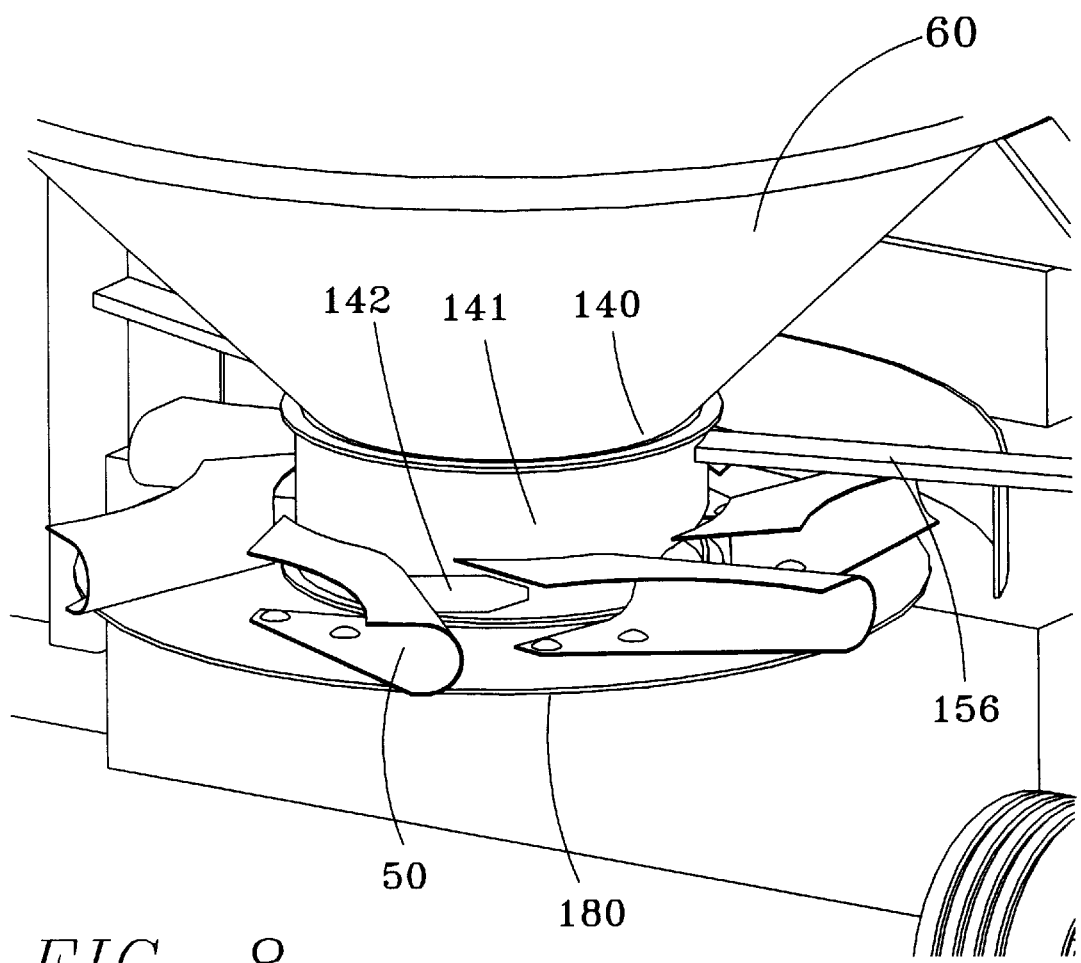
FIG. 8 is an isometric view of the vanes and vane support plate, the housing and the base of the cone.

Referring to FIG. 8, housing support elements 156 carry the housing 140 below the narrow lower end 61 of the cone 60.

The number of wheels and tires 160 used to support the frame may be increased, as desired, to reduce the weight each tire supports. This is advantageous when the spreader is used in wet or soft soil or grass, since little or no deformation of the terrain results.

A cone 60 is sized to contain a supply of granular material to be distributed. The cone is supported by the cone support loop 155 of the frame, and is oriented with the narrow lower end 61 directed downwardly and the wide upper end 62 directed upwardly. In a preferred embodiment, the upper wide end of the cone is open, so that granular material may readily be loaded into the cone. If desired, a cover may be used to enclose the wide upper end. The lower end of the cone is closed by the valve 70, so that the flow of granular material from the cone may be controlled.

A valve 70 is located immediately below the narrow lower end 61 of the cone 60. The degree to which the valve 70 is opened regulates the rate flow of granular material out of the cone 60. By controlling the rate at which material is transferred out of the cone, the density of distribution on the ground is controlled.

In a preferred embodiment, the valve 70 is pneumatically controlled. Alternatively, any other available power source may be used to open and close the valve. Where a pneumatic control is used, a control valve regulates the flow of compressed air from a storage tank 71 which is used to power a piston in a cylinder, which in turn opens and closes the valve.

A preferred power supply includes a power take off attachment 170 (PTO) adapted for connection to standard yard tractor PTO units. Alternatively, an engine or other power source may be substituted. The PTO attachment drives gear sprockets and chains in a known manner. Using the power source, the drive shaft 20 is turned, and the blade support plate 30 and vane support plate 180 are rotated.

Figure 3:
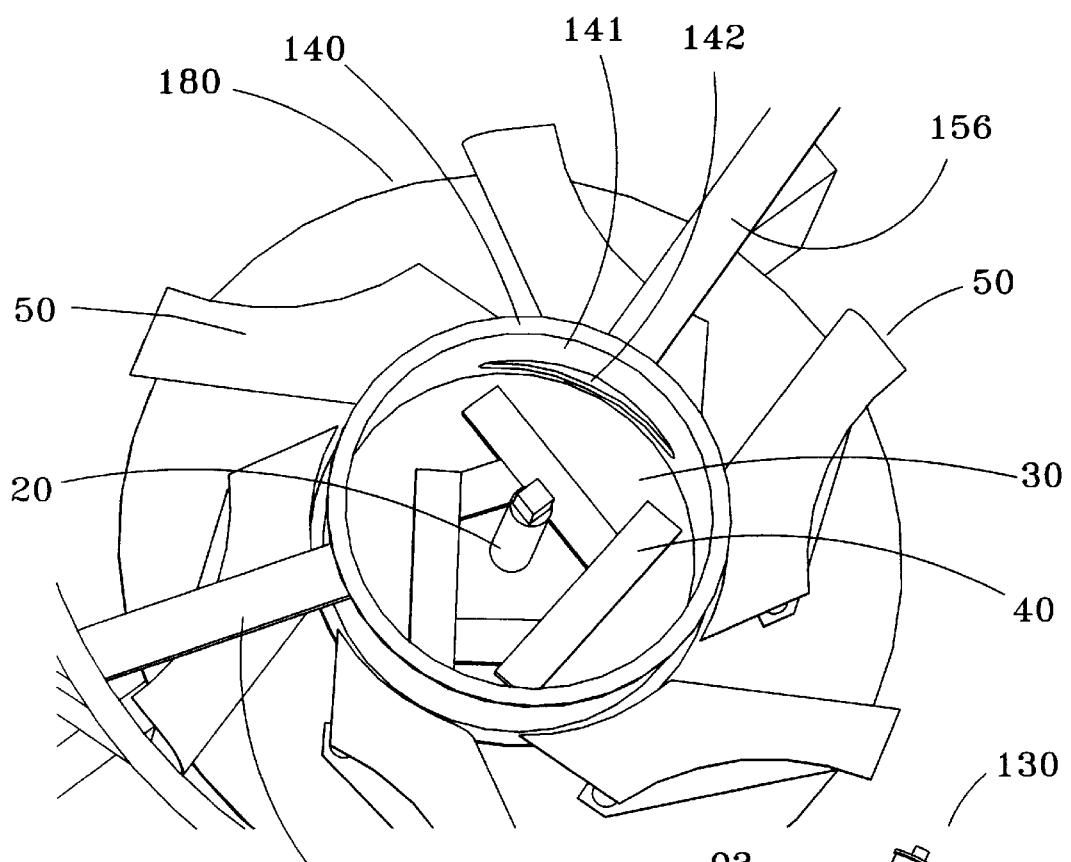
FIG. 3 is a view of the vanes mounted on the vane support plate, the blades mounted on the blade support plate, the housing and the upper portion of the drive shaft. The cone and other assemblies are removed, for purposes of illustration.

As seen in FIG. 3, a drive shaft 20 is oriented vertically, along the axis of the cone. The lower end of the drive shaft is driven by chains and gears powered by the PTO attachment 170. The upper end of the drive shaft is slightly above the valve 70 at the base of the cone.

Figure 6:
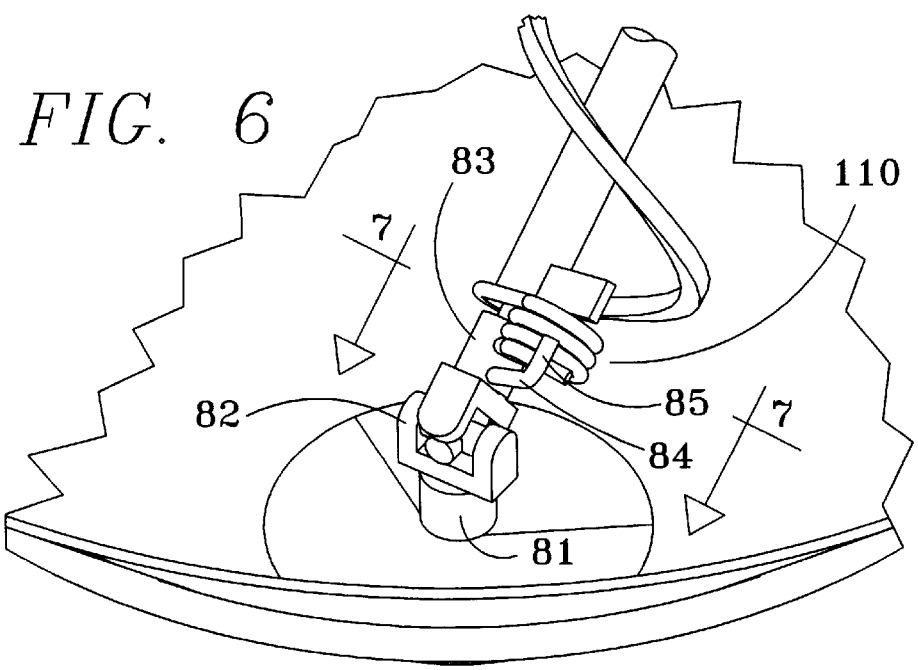
FIG. 6 is an enlarged view of the U-joint, drive spring and lower portions of the helix and the outer sleeve of the bin sweep assembly.

As seen in FIG. 6, a U-joint 80 is carried by an upper end of the drive shaft 20. The U-joint allows the rotation of the vertically oriented drive shaft to power the bin sweep assembly 90 which is supported at an angle parallel to the inside surface 64 of the cone 60.

A lower socket 81 fits over the upper end of the vertically oriented square drive shaft 20. An upper socket 83 fits over the lower end of the bin sweep drive drive shaft 91. A pivot 82, carried between the upper and lower sockets, provides a hinged joint that allows the bin sweep drive shaft 91 to assume a non-vertical orientation, despite the vertical orientation of the drive shaft 20.

A radially extending arm 84 extends outwardly from the U-joint, adjacent to the upper socket 83. A spring drive rod 85 extends perpendicularly from the radially extending arm, and is parallel to the bin sweep drive shaft 91. Due to rotation of the U-joint, the spring drive rod 85 rotates at the same rate as the bin sweep drive shaft which is carried by the upper socket 83. The spring drive rod 85 is in contact with the lower end 112 of the drive spring 110. Due to this contact, the spring drive rod causes the drive spring to rotate about the lower end of the bin sweep drive shaft.

A bin sweep assembly 90 is carried within the cone, and breaks up clumps of the granular material, sending the material in granular form to the narrow lower end 61 of the cone 60.

Figure 4:
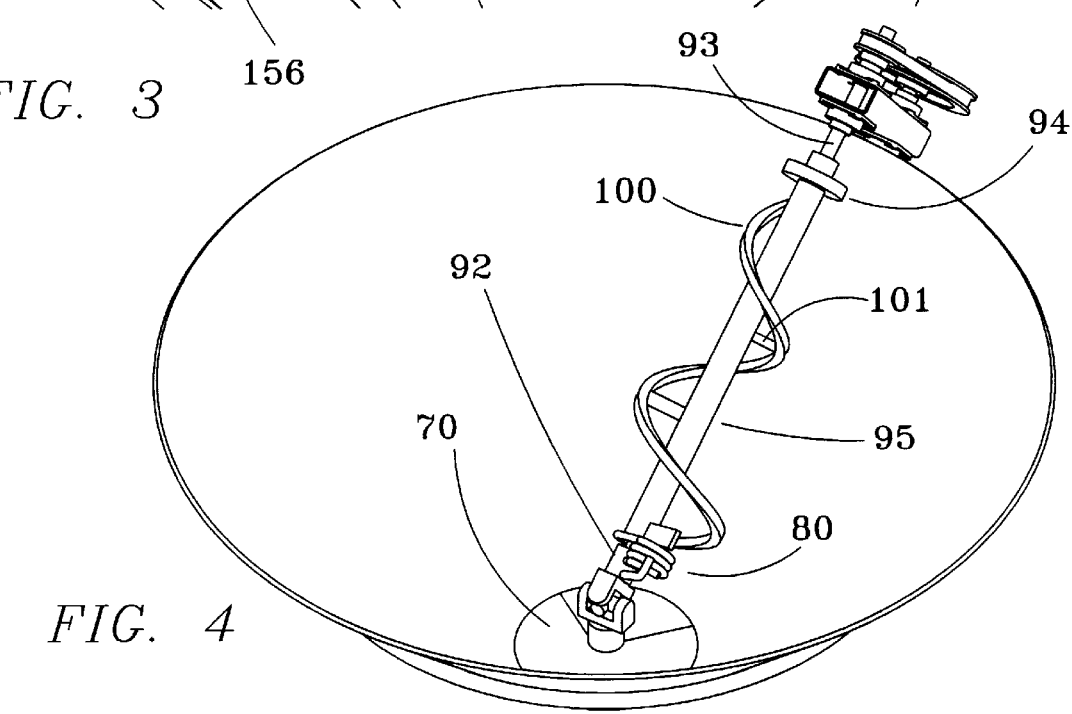
FIG. 4 is a view of the cone, the bin sweep assembly and the bin sweep drive assembly.
Figure 5:
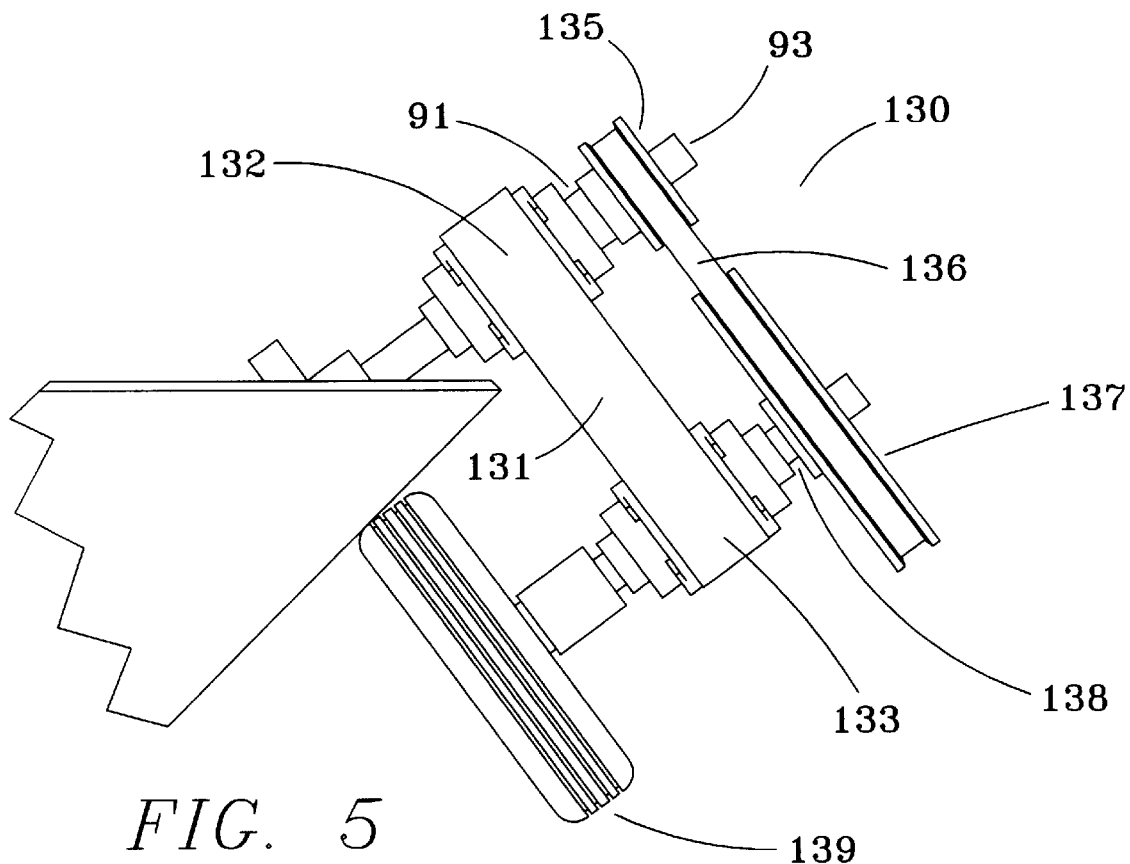
FIG. 5 is an enlarged view of the bin sweep drive assembly.

The bin sweep assembly includes a bin sweep drive shaft 91 which carries an outer sleeve 95. As seen in FIGS. 4 and 6, the lower end 92 of the bin sweep drive shaft is driven by the U-joint. As seen in FIGS, 2, 4 and 5, the upper end 93 of the bin sweep drive shaft carries a roller 94, which rolls about an upper inside perimeter 66 of the cone adjacent to the upper rim 63.

An outer sleeve 95 is carried by the bin sweep drive shaft 91. In operation, the outer sleeve rotates in the same direction and at the same rate as the bin sweep drive shaft.

Figure 2:
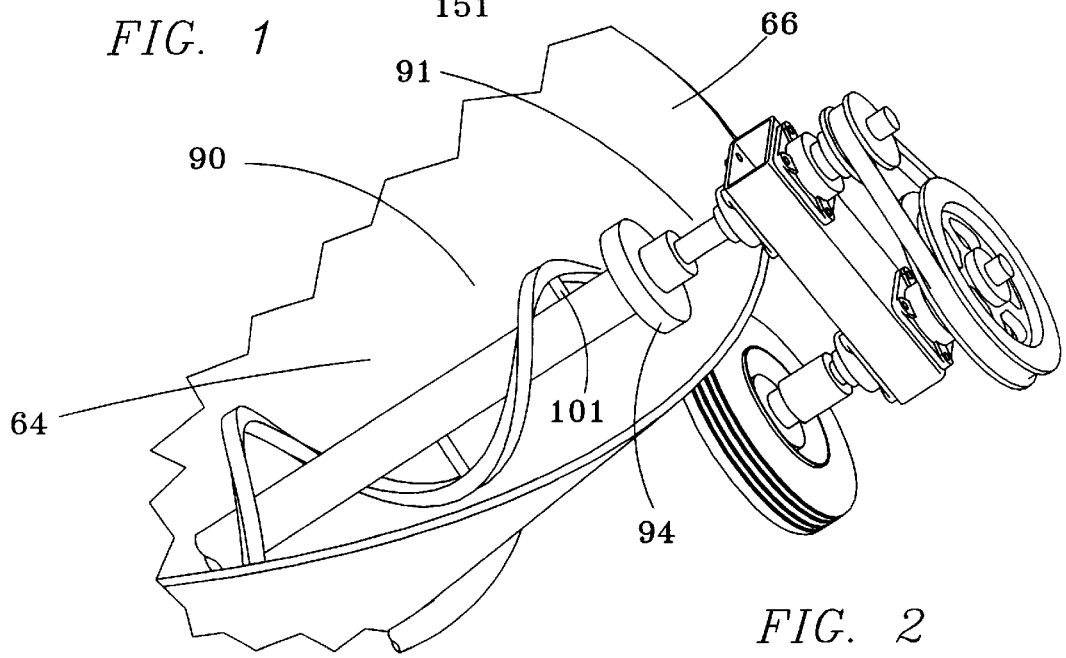
FIG. 2 is an enlarged isometric view of an upper portion of the cone and the helix and bin sweep drive assembly.

A helix 100 is carried by, and rotates at the same rate as, the outer sleeve 95. Movement of the helix forces granular material toward the base of the cone. As seen in FIGS. 2 and 4, the helix is supported by arms 101 that attach the helix to the outer sleeve 95, carried by the bin sweep drive rod.

Figure 7:
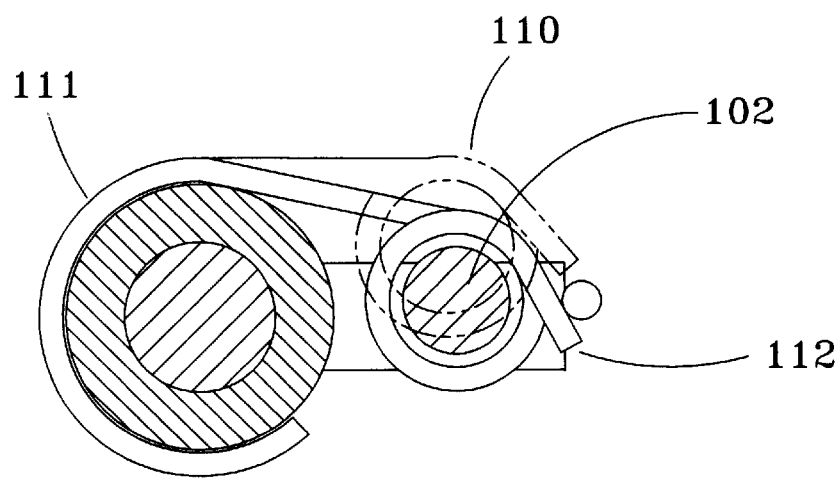
FIG. 7 is an enlarged cross-sectional view of the drive spring, also showing the bin sweep drive shaft, the outer sleeve and the spring drive rod in cross-section.

As seen in particularly in FIG. 2, the helix is attached to the sleeve 95 by a plurality of support arms 101. A lower support arm carries a spring support spindle 102, which is perpendicular to the support arm and parallel to the outer sleeve. The spring support spindle carries the drive spring 110, as seen in FIG. 7.

Figure 7A:
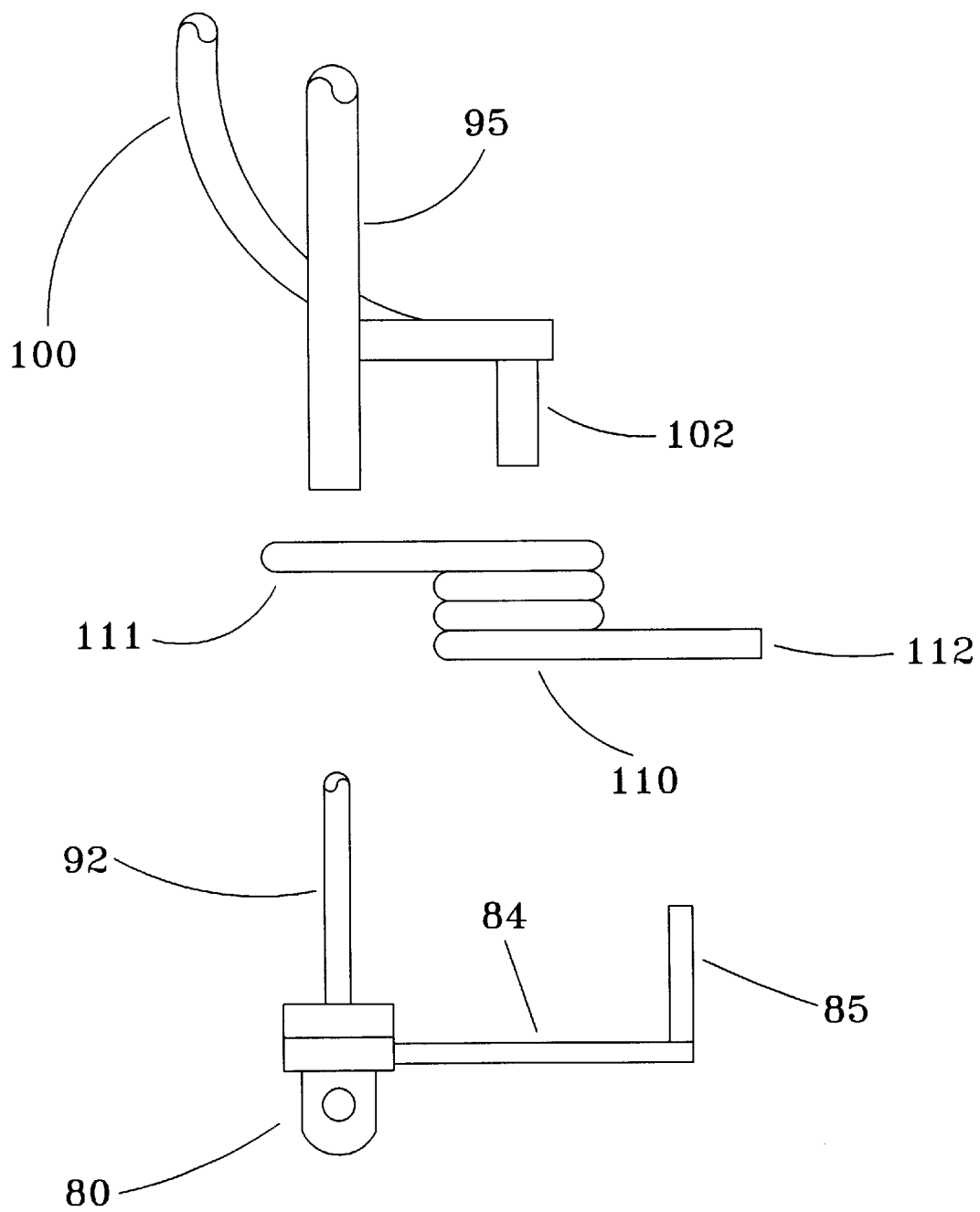
FIG. 7A is an enlarged exploded view of the drive spring, also showing the bin sweep drive shaft, the outer sleeve and the spring drive rod.

In a preferred embodiment, the drive spring 110 is a coil-type spring, the coil portion of which wraps about the spring support spindle 102 carried by the lower support arm of the helix 110. As seen in FIGS. 7 and 7A, the upper end 111 of the drive spring is slipped over, and partially wraps about, the outer sleeve 95. The lower end 112 of the drive spring is in contact with the spring drive rod 85 carried by the radially extending arm 84 of the U-joint 80.

During operation, rotation of the drive shaft 20 rotates the U-joint 80. Rotation of the U-joint causes the radially extending arm 84 and spring drive rod 85 to rotate. In the course of rotation, the spring drive rod makes contact with the lower end 112 of the drive spring 110. Once in contact, the spring drive rod 85 pushes the spring in a circular orbit about the bin sweep drive shaft. Because the coil portion of the drive spring 110 is carried by the spindle 102 carried by the arm 101 extending from the outer sleeve, the outer sleeve is also moved in an orbit about the bin drive shaft. Because the helix is carried by the outer sleeve, the helix also moves in a circular orbit about the bin sweep rod.

It is a significant aspect of the structure incorporating the drive spring that damage is prevented in the event that the helix becomes stuck. It is not uncommon for this to happen, since hard chunks of granular material or impurities, such as small rocks, may be found within the cone. When such a rock or rigid chunk becomes wedged between the cone and helix, the helix will no longer rotate.

Should the helix become stuck for some reason, the drive spring 110 will flex sufficiently to prevent damage, thereby resulting in a sound that would alert the operator. Referring particularly to FIGS. 7 and 7A, it can be seen that where the drive spring is sufficiently stressed, the spring drive rod 85 will flex the spring sufficiently that the drive rod will move past the lower end 112 of the drive spring 110. As the spring drive rod moves past the lower end, a snapping sound results, alerting the operator that the helix is stuck.

It is also a significant aspect of the structure incorporating the drive spring that during the starting process, when the bin sweep is first activated, that the spring may flex sufficiently to result in a soft start, i.e. a start that does not over stress the drive components.

Rotation of the bin sweep rod 90 drives the bin sweep drive wheel assembly 130. The bin sweep drive wheel assembly causes the bin sweep rod to orbit about the inside surface 64 of the cone; i.e. the bin sweep rod moves in a manner that causes it to pass over the entire surface inside the cone in a repetitive manner.

The bin sweep drive wheel assembly 130 includes a bracket 131 having a first end 132 which is carried by a bearing surface near the end of the bin sweep drive drive shaft. A bearing surface carried within the second end 133 of the bracket supports an axle 138 which is parallel to the bin sweep drive shaft and located on the outside of the cone. A small pulley wheel 135 is carried by the end of the bin sweep drive shaft. The small wheel drives a belt 136 or similar chain. The belt drives a large pulley wheel 137 carried by the upper end of the axle 138. The lower end of the axle 138 carries a wheel with a tire 139 which makes frictional contact with an upper outside perimeter 65 of the outside surface of the cone.

Rotation of the bin sweep rod 90 turns the small pulley wheel 135 which in turn causes a belt 136 to rotate. The belt rotates a large pulley wheel 137 supported by an axle 138. Rotation of the axle turns the tire 139. Friction between the tire and the upper outside perimeter 65 of the cone causes the bin sweep assembly to move about the rim of the cone in a circular manner. Due to the nature of the U-joint connected to the lower end of the bin sweep rod, the bin sweep rod is able to move in a circular manner around the inside of the cone.

A housing 140, carried below the narrow lower end 61 of the cone 60, receives granular material which passes through the valve 70 carried at the base of the cone. One or more slots 142 are defined in a sidewall 141 of the housing allow granular material to be ejected radially. The slots may be fixed or adjustable, as desired.

The housing is carried by housing support elements 156, and is therefore attached to the frame in a fixed orientation. As a result, strategic location of the slots in the housing prevents granular material exhausted from the housing from hitting elements of the frame or tractor and gives the proper shape and form to the granular ejected.

As seen in FIG. 4, blades 40 are carried by the blade support plate 30. The blade support plate is carried at the base of the housing. Rotation of the blade support plate by chain-driven gears attached to a power source, such as the PTO attachment, result in rotation of the blades. As granular material passes from the base of the cone, through the valve, and into the housing, the blades direct the downwardly-moving granular material in the radial direction. As the granular material moves radially, it exits the housing through the slots 142 defined in the housing.

As seen in FIGS. 1, 3 and 8, a vane support plate 180 carries a plurality of vanes 50. Rotation of the vane support plate by chain-driven gears, powered by the PTO or other power source, causes the vanes to move in a circular manner.

Granular material pushed by the blades 40 through slots 142 defined in the housing is contacted by the vanes as they move in a circular pathway about the housing. Due to the rotational speed of the vanes, the granular material is thrown a desired distance. The gears driving the vane support plate may be regulated to result in the desired vane speed and granular material throwing distance. The size and shape of the vanes may also be adjusted to determine the distance the material is thrown.

The previously described versions of the present invention have many advantages, including a primary advantage of providing a novel granular material spreader having a two-stage material throwing structure, wherein blades mounted on a blade support plate push granular material from the housing, and vanes carried on an outer portion of the vane support plate throw granular material radially outward.

Another advantage of the present invention is to provide a novel granular material spreader which provides a housing which is slotted in a manner which prevents granular material being directed into the spreader frame or toward the tractor towing the spreader, and results in the shape of the spread of the granular material forming in an evenly distributed pattern substantially behind the granular material spreader.

Another advantage of the present invention is to provide a novel granular material spreader which provides a drive spring carried by the bin sweep drive shaft, whereby the drive spring drives a helix which sweeps the sides of the cone. When the helix becomes jammed, the drive spring flexes to allow continued rotation of the bin sweep drive shaft while the helix is stuck, thereby preventing both from damage.

A still further advantage of the present invention is to provide a novel granular material spreader which includes a frame supporting wheels set to the rear of the center of gravity of the spreader, thereby increasing the hitch weight of the spreader.

Although the present invention has been described in considerable detail and with reference to certain preferred versions, other versions are possible. For example, while Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A granular material spreader, comprising:
   (A) a frame, supported by wheels and carrying a power supply;
   (B) a cone, having a narrow end directed downwardly, is supported by the frame; and
   (C) a bin sweep assembly, carried by the cone, comprising:
      (a) a bin sweep drive shaft, carried a short distance from an inside surface of the cone, having a lower end attached by means of a U-joint to a drive shaft powered by the power supply;
      (b) an outer sleeve, carried by the bin sweep drive shaft;
      (c) a bin sweep drive wheel, in frictional contact with an upper peripheral rim of the cone, the bin sweep drive wheel powered by the bin sweep drive shaft, whereby the bin sweep drive wheel causes the bin sweep drive shaft to move around the interior surface of the cone;
      (d) a helix, carried by the outer sleeve, whereby rotation of the helix tends to sweep an inside surface of the cone; and
      (e) a drive spring, carried by the outer sleeve, having a first end driven by an arm extending from the U-joint, whereby the drive spring is sufficiently flexible to allow the arm extending from the U-joint to pass should the helix become jammed.

2. The granular material spreader of claim 1, additionally comprising:
   (A) a valve at the narrow end of the cone; and
   (B) a housing, carried by the frame below the narrow end of the cone, defining slots to allow granular material to be ejected radially.

3. The granular material spreader of claim 2, additionally comprising:
   (A) a blade support plate, carried adjacent to a lower portion of the housing, the blade support plate driven in a rotary manner by the power supply; and
   (B) blades, carried by the blade support plate.

4. The granular material spreader of claim 1, additionally comprising:
   (A) a vane support plate, carried adjacent to the blade support plate, the vane support plate driven in a rotary manner by the power supply; and
   (B) vanes on the outer portion of the vane support plate.

5. A granular material spreader, comprising:
   (A) a frame, supported by wheels and carrying a power supply;
   (B) a cone, having a narrow end directed downwardly, is supported by the frame;
   (C) a bin sweep assembly, carried by the cone, comprising:
      (a) a bin sweep drive shaft, carried a short distance from an inside surface of the cone, having a lower end attached by means of a U-joint to a drive shaft powered by the power supply;
      (b) an outer sleeve, carried by the bin sweep drive shaft;
      (c) a bin sweep drive wheel, in frictional contact with an upper peripheral rim of the cone, the bin sweep drive wheel powered by the bin sweep drive shaft, whereby the bin sweep drive wheel causes the bin sweep drive shaft to move around the interior surface of the cone;
      (d) a helix, carried by the outer sleeve, whereby rotation of the helix tends to sweep an inside surface of the cone; and
      (e) a drive spring, carried by the outer sleeve, having a first end driven by an arm extending from the U-joint, whereby the drive spring is sufficiently flexible to allow the arm extending from the U-joint to pass should the helix become jammed;
   (G) a valve at the narrow end of the cone;
   (H) a housing, carried by the frame below the narrow end of the cone, defining slots to allow granular material to be ejected radially;
   (I) a blade support plate, carried adjacent to a lower portion of the housing, the blade support plate driven in a rotary manner by the power supply;
   (J) blades, carried by the blade support plate;
   (K) a vane support plate, carried adjacent to the blade support plate, the vane support plate driven in a rotary manner by the power supply; and
   (L) vanes on the outer portion of the vane support plate.

* * * * *